(12) United States Patent
Griscom

(10) Patent No.: X7139
(45) Date of Patent: Jun. 23, 1832

(54) KILN,LIME

(76) Inventor: Samuel Griscom

Samuel Griscom,
Letters Patent

The Schedule referred to in these Letters Patent and making part of the same, containing a description in the Words of the said Samuel Griscom himself of his improvement in the Kiln for burning Lime with Anthracite Coal.

To all to whom these Presents shall come:

Be it known that I Samuel Griscom of Reading in the County of Berks & State of Pennsylvania have invented a new useful & improved Kiln & also a method for altering common wood, & other Kilns for the burning of Lime with Anthracite & other coal, and that the following is a full and exact description of the construction, alteration & operation of said Kilns, as invented or improved by me.

The Kiln is twenty feet by ten feet at the base raised to a proper height and erected in the following manner.

Parallel walls are made ten feet long two feet high & sixteen or eighteen inches thick, leaving intervals of about eighteen inches between each wall, the end walls of the Kiln are to be run up, upon the outer or external of those parallel walls. — The side wall for the rear of the kiln, is to be run up so that the parallel walls will jut up against it, the front wall of the kiln is to be built over & rest upon the ends of the parallel walls, thus leaving the interval between the parallel walls open in front of the kiln a door is left in the centre of the front wall of the Kiln four feet wide & five feet high, to take in the lime stone & Coal, and take out the Lime.

The kiln is filled by laying Lime stone to stretch from one parallel wall to the other, thus forming upon the parallel walls a bed of limestone over which is spread a layer of coal, then a layer of limestone, then again a layer of coal, and so on, layers of Limestone & Coal alternately until the kiln is full.. It is to be burned by making fires of wood at the openings or intervals & igniting the coal and let stand until it burns out.

And any lime kiln differently constructed may be allowed so as to burn lime on the same principle.

Samuel Grissom

Witnesses

J. L. Dunn

John H. Meister

Cad

J. J. R.